Figure 1:
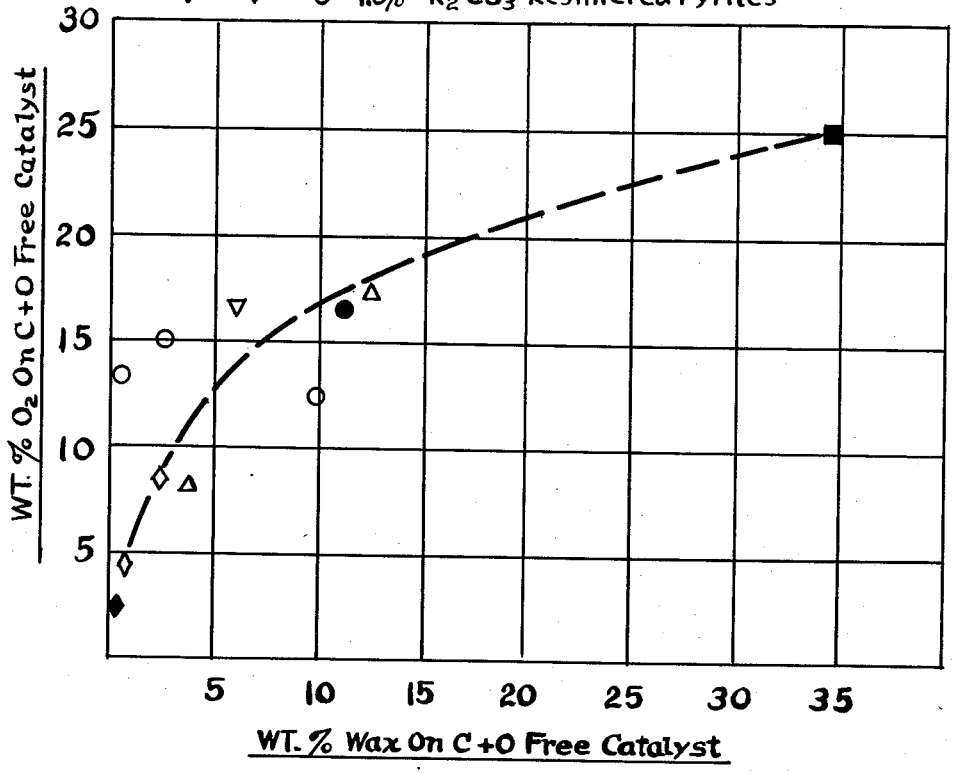

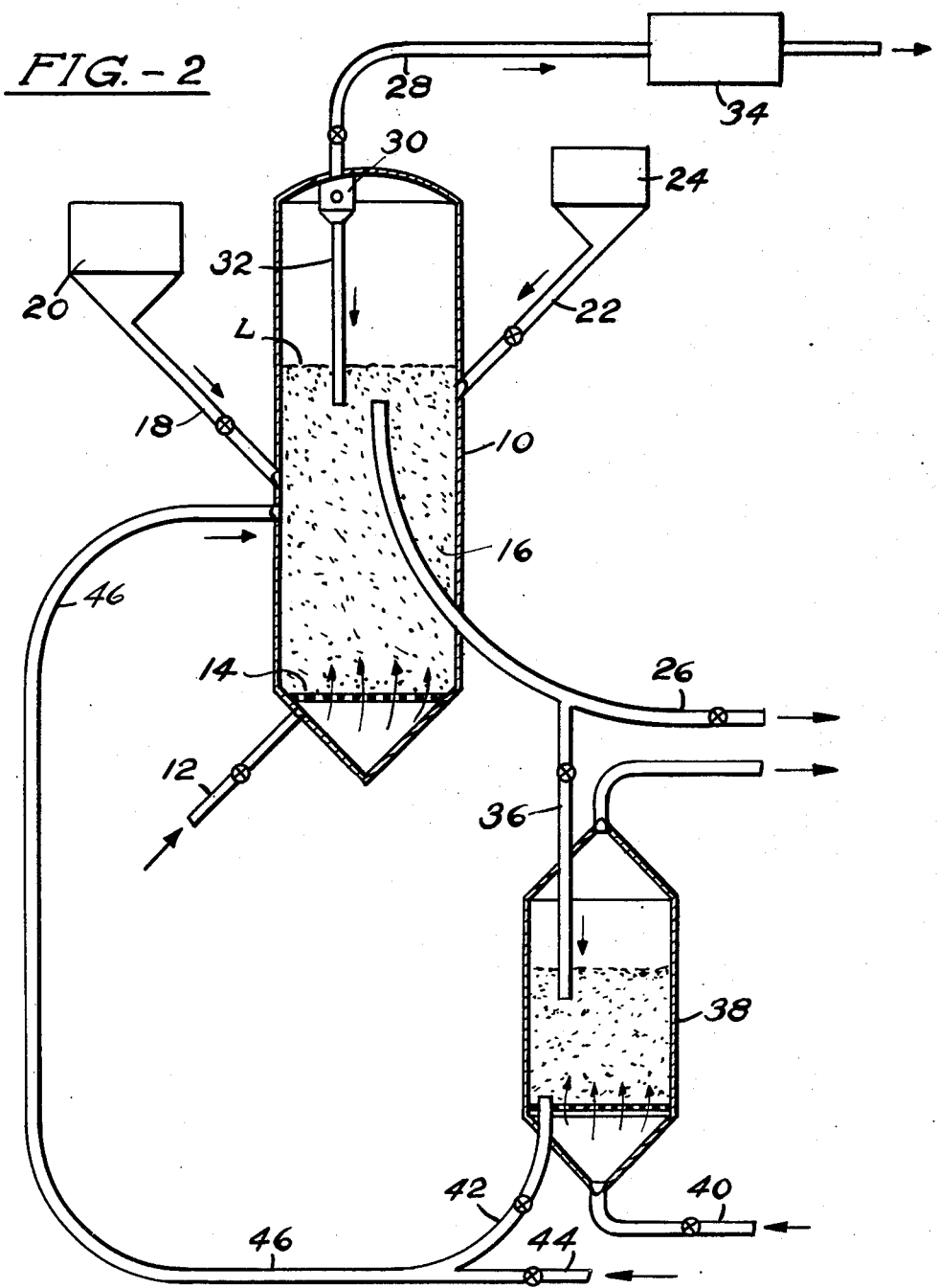

Patented Sept. 16, 1952

2,610,975

UNITED STATES PATENT OFFICE 2,610,975

PROCESS FOR THE SYNTHESIS OF HYDROCARBONS FROM CARBON MONOXIDE AND HYDROGEN WITH AN IRON TYPE CATALYST

John J. Owen, Baton Rouge, and Simpson D. Sumerford, East Baton Rouge, La., assignors to Standard Oil Development Company, a corporation of Delaware Application May 12, 1948, Serial No. 26,538

4 Claims. (Cl. 260—449.6)

This invention relates to the catalytic conversion of the oxides of carbon with hydrogen to form valuable synthetic products, and more particularly to the synthesis reaction of hydrogen with carbon monoxide in the presence of iron base catalysts.

The invention will be fully understood from the subsequent detailed description wherein reference will be made to the accompanying drawing.

It is well known in the art that oxides of carbon may be reacted with hydrogen in the presence of suitable catalysts at temperatures between about 380° F. and about 800° F. and at pressures varying from atmospheric to about 100 atmospheres and higher to prepare hydrocarbons and oxygenated organic compounds. The temperatures and pressures employed depend mainly upon the catalyst employed, the character of the feed and the final products desired. Compositions containing either iron, cobalt, or nickel with minor amounts of promoter substances such as compounds of the alkali and rare earth metals are employed as catalysts alone or associated with carriers such as alumina, silica or silicates, carbon, magnesia etc.

The synthesis reaction is now widely effected in the presence of a fluidized catalyst, that is, the synthesis gas is contacted with the catalyst in a finely divided state fluidized by the upflowing gasiform reactants and reaction products to form a dense turbulent mass similar in many respects to a boiling liquid. This technique affords important advantages with respect to temperature control and continuity of operation.

Catalyst masses containing iron in major amounts are widely used in the synthesis reaction to produce a predominantly unsaturated product from which valuable motor fuels of high straight run octane number and substantial amounts of oxygenated products may be recovered. These iron base catalysts are usually prepared by the reduction of a variety of natural and synthetic iron oxides; or by the decomposition of iron carbonyls; or the heating of an iron salt such as ferrous oxalate. The final catalyst usually consists substantially of reduced iron. Iron base catalysts have also been obtained from such sources as magnetite, mill scale or pyrites ash by suitable treatments including reduction. Magnetite may be obtained from natural deposits while mill scale is a by-product from steel industry and pyrites ash is a by-product from the sulfuric acid industry. All are substantially pure iron oxide.

The activities of these iron base catalysts are usually enhanced by the addition of compounds of alkali metals or the oxides of zinc, aluminum, magnesium, manganese and the rare earth metals in amounts between about 0.5 and 10% by weight of the iron. These compounds may be added to the iron base by simple impregnation followed by drying at 300° to 400° F., or followed by sintering at 1600° to 2200° F. The promoter compounds also may be added to the iron base while it is maintained in a molten condition.

For use as a fluidized catalyst, the particle sizes of iron-type catalysts usually vary from about 1 micron to 200 microns and higher and preferably in the range from about 10 microns to 100 microns. With such particle sizes, the catalyst bed can be satisfactorily fluidized; that is, the catalyst, the reacting gases and reaction vapors form a pseudo-liquid of aerated catalyst particles, the high turbulence of which permits the maintenance of relatively uniform temperatures throughout the catalyst mass and which exhibits the hydrostatic and hydrodynamic characteristics of a liquid.

Prior to the present invention, the fluid-type synthesis process employing iron-type catalysts has been used mainly for the production of high-octane motor fuels while all other reaction products including higher boiling hydrocarbons such as fuel oils, lubricating oils or waxes were of lesser importance. Actually, hydrocarbons of the gasoline and gas oil range constitute invariably by far the major proportion of the liquid product from conventional iron-catalyzed synthesis processes chiefly due to the fact that the high temperatures and pressures required for satisfactory conversion on iron catalyst are unfavorable to the formation of high-molecular weight compounds. When products of a substantially higher molecular weight were desired in more significant yields, it had been necessary heretofore to use different catalysts, particularly cobalt-type catalysts, whose application is associated with milder temperature and pressure conditions. The market demand for the various hydrocarbon products varies greatly within relatively short times and depending on location. However, it is hardly feasible to follow every change in market demand by a change in the catalyst used, because this would require a complete redesign of equipment and operation. There is therefore a strong need for a simple means adapted to change the molecular weight distribution of the hydrocarbon product of the iron-catalyzed synthesis process. The present invention fills this need.

It is therefore the principal object of the present invention to provide an improved process for the catalytic production of valuable synthetic products from CO and $H_2$, which is more flexible with respect to the molecular weight of the products formed.

A more specific object of the invention is to provide an improved process of the type specified which employs iron catalysts in the fluidized state.

Other objects and advantages will appear hereinafter.

It has been found that the molecular weight of the synthetic products formed in the catalytic conversion of CO with $H_2$ on fluidized iron catalysts depends to a large extent on the oxygen content of the catalyst. More specifically, it has been found that the molecular weight of the synthesis products increases substantially when the oxygen content of the catalyst increases, until large proportions of waxy materials are formed. Based on this discovery the present invention provides for a control of the oxygen content of iron synthesis catalysts in accordance with the desired molecular weight or wax content of the synthetic product.

Unreduced iron catalyst which usually is substantially $Fe_3O_4$ or $Fe_2O_3$ has an oxygen content of about 38-43%, based on pure iron. Theoretically, therefore, highest yields of wax-like and other high molecular weight products should be obtainable when using unreduced catalyst and this has been found to be actually the case. However, it has been found that oxygen contents of this magnitude seriously interfere with a proper operation, and particularly with proper fluid operation of the synthesis process. The cause of these difficulties is believed to be excessive formation of products of highest molecular weight which at the temperatures (500°-700° F.) and pressures (150-750 p. s. i. g.) required for the iron-catalyzed synthesis are deposited on the catalyst. These wax deposits cause agglomeration of the catalyst particles to aggregates which cease to be fluidizable at the reaction conditions.

This effect is demonstrated by the experimental data reported in Table I below which presents a summary of three fluid synthesis runs carried out at an $H_2$:CO ratio of about 2:1 and with an iron oxide base catalyst promoted with 1.5% of $K_2O$.

TABLE I

| Catalyst Preparation | Reduced | Unreduced | Unreduced |
| --- | --- | --- | --- |
| Percent $O_2$ on Cat., Fe Basis | 5 | 39.6 | 39.6 |
| Pressure, p. s. i. g | 400 | 400 | 400 |
| Catalyst Temperature, Specified, °F | 650 | 650 | 650 |
| Catalyst Temperature, Max. Range, °F | 650-655 | 650-743 | 650-783 |
| Feed, v./v./hr | 1,350 | 1,330 | 1,250 |
| Duration of Run, hrs | 387 | 38 | 45 |

It will be seen that in the run using reduced catalyst the maximum temperature range throughout the catalyst mass was only 5° F. for a duration of about 400 hours while the runs using unreduced catalyst had to be discontinued after less than 50 hours when the temperature range over the catalyst bed approached or exceeded 100° F. as a result of poor fluidization.

In accordance with the present invention, therefore, the oxygen content of the catalyst mass is maintained somewhere between complete reduction and complete oxidation. A broad operation range is an oxygen content of up to about 35%, based on pure iron, within which specific values may be selected depending on the amount and molecular weight of high molecular weight products desired. More specifically, it may be stated that satisfactory yields of waxy materials may be obtained at oxygen contents of the catalyst of about 10-30%, based on pure iron, without affecting the fluid characteristics of the catalyst mass.

In accordance with one embodiment of the invention the oxygen content of the catalyst is controlled by the addition of controlled amounts of fresh unreduced fluidizable iron catalyst to a fluidized mass of substantially reduced iron catalyst in synthesis operation.

Between about 2% to 10% of catalyst inventory per day of unreduced iron oxide catalyst may be added to a hydrocarbon synthesis reactor containing reduced or partially reduced iron catalyst depending on the desired molecular weight of the product. The addition of iron oxide catalyst in these amounts to a bed of substantially reduced iron catalyst avoids the operating difficulties caused by the formation of excessive quantities of high boiling hydrocarbons and the resulting proper fluidization conditions. The actual total oxygen content of the catalyst mass is greater than the equivalent of oxygen added with the unreduced catalyst, because the initially reduced catalyst is likewise oxidized at the synthesis conditions until it reaches an equilibrium content of about 5-20% of oxygen, based on pure iron. Thus this embodiment of the invention provides for the introduction of unreduced iron base catalysts in desirable incremental quantities to the hydrocarbon synthesis reactor depending upon the molecular weight of the hydrocarbons in the oil that it is desired to obtain, upon the level of conversion it is desired to maintain, and upon the desired level of the fluidized catalyst in the reactor.

In some types of operation there may be an expansion of catalyst volume because of carbon deposition and catalyst fragmentation. In accordance with the embodiment of the present invention just described any desired volume of catalyst in the reactor and substantially any carbon concentration on the catalyst such as between about 15% to about 25% by weight of the reduced catalyst may be maintained by withdrawing, continuously or periodically, appropriate quantities of used catalyst from the upper portion of the bed where the particle size is smallest and the carbon concentration on the catalyst is greatest and adding controlled quantities of unreduced catalyst. Since unreduced catalyst has a tendency to become partially reduced under operation conditions, an equilibrium state between reduced and unreduced catalytic material containing oxygen in an amount between about 10% and 30% by weight of the reduced catalyst may thus be maintained by control of the withdrawal of the used catalyst and introduction of the unreduced catalyst. The molecular weight of the hydrocarbon product may be controlled in this manner.

*Example I*

The following data illustrate the effect of introduction of unreduced catalyst into the system in accordance with this embodiment of the invention.

TABLE II

Conditions:
    Temperature, °F _____ 650
    Pressure, p. s. i. g _____ 400
    Throughput, v./v./hr _____ 3500
    $H_2$:CO ratio _____ 2/1
    Linear velocity, ft./sec _____ 0.37
Catalyst:
    Type, iron oxide base
    Unreduced $O_2$-content, 39% based on Fe
    Average particle size, 90 microns

| Hours | Catalyst Started | Catalyst Added | Pour Point of Collected Oil, °F. | Oil Recovered cc./m.³ of Feed | $C_4+$ Yield, cc./m.³ of $H_2+CO$ Consumed |
|---|---|---|---|---|---|
| 22-45 | Reduced (638 g.) | | −60 | 100 | 188 |
| 70-93 | | | −60 | 93 | 185 |
| 115-138 | | Unreduced (168g.) | +5 | 116 | 202 |
| 182-193 | | Unreduced (168g.) | +30 | 116 | 190 |
| 218-229 | | Unreduced (168g.) | +55 | 94 | 175 |
| 230-253 | | | +40 | 107 | 191 |
| 254-277 | | | −5 | 103 | 190 |

Catalyst amounting to about 40% of the expanded catalyst volume was withdrawn at hour 93 and hour 158 from an upper portion of the reactor.

*Example 2*

Given in Table III are results that were obtained in another run which was made with the catalyst of Example 1 under substantially the same conditions as were employed in Table II but without addition of unreduced catalyst.

TABLE III

Conditions:
    Temperature, °F _____ 650
    Pressure, p. s. i. g _____ 400
    Throughput, v./v./hr _____ 1360
    $H_2/CO$ ratio _____ 2/1
    Linear velocity, ft./sec _____ 0.37
Catalyst:
    Type, iron oxide base
    $O_2$ content after reduction, 5% based on Fe
    Average particle size, 96 microns

| Yields, Vol. Percent of $C_4+$ | Percent Unsats. | Res. O. N.+ 2 cc. TEL |
|---|---|---|
| Excess $C_4$, 15.0 | 75 | |
| Gasoline, 62.4 | | 82.0 |
| 400° F.+Bottoms, 22.6 | | |

The presence of a high percentage of gasoline and a relatively low percentage of 400° F.+ bottoms which cooperate to establish a pour point of the order of −60, demonstrates the fact that the completely reduced catalyst was not conducive to the formation of wax-type constituents.

From these data it will be seen that the addition of unreduced catalyst causes an increase in the molecular weight of the product since three additions of unreduced catalyst increased the pour point from −60 to +55° F. However, when the addition of unreduced catalyst was discontinued, the material became less waxy indicating that the tendency to form high molecular weight material is a transient condition when unreduced catalyst is added. It is evident, therefore that the molecular weight of the reaction product can be controlled by the addition of unreduced catalyst to the hydrocarbon synthesis reactor.

In accordance with a further embodiment of the invention the oxygen content of the iron catalyst, and with it the molecular weight of the synthetic product, is controlled by periodic hydrogenation and/or oxidation of the catalyst in situ or in separate treating equipment. Depending on the desired molecular weight of the reaction product and the equilibrium oxygen content of the iron catalyst at the prevailing synthesis conditions the synthesis gas supply may be periodically replaced by the supply of a more strongly oxidizing gas such as air, $CO_2$, steam and/or oxygen or of a more strongly reducing gas such as pure hydrogen or a gas mixture richer in hydrogen than the synthesis gas used. Similar treatments may be carried out in separate treating zones, without interrupting the synthesis reaction, by periodically or continuously circulating suitable proportions of the fluidized catalyst from the synthesis reactor to the treating zone and back to the synthesis reactor in a manner well known in the art of fluid solids handling.

Suitable catalyst oxidation conditions include treating with steam alone or with steam-air mixtures containing 1 to 10% $O_2$ at 0–750 p. s. i. g., 500°–750° F. and velocities from 0.3 to 1.5 ft./sec. specific conditions depending on the degree of oxidation desired and the nature of the catalyst. Hydrogenation may be carried out quite generally at 0–750 p. s. i. g., 650°–1100° F. and 0.3 to 1.5 ft./sec. with pure $H_2$ or with gases rich in $H_2$ depending on the desired oxygen content of the catalyst and the nature of the catalyst.

The oxygen content of the catalyst may be also controlled in situ without interrupting the synthesis reaction, by altering the nature of the entering feed to give a more oxidizing or more reducing atmosphere in the reactor. The oxidizing activity of the feed may be conveniently increased by addition of extraneous steam with the total feed, or by decreasing the ratio of $H_2/CO+CO_2$ in the feed, and decreased by increasing the ratio of $H_2/CO+CO_2$ in the feed.

*Example 3*

Another run was conducted as follows:
Conditions:
    Temperature, °F _____ 650
    Pressure, p. s. i. g _____ 400
    Throughput, v./v./hr _____ 3500
    $H_2/CO$ ratio _____ 2/1
    Linear velocity, ft./sec _____ 0.4–0.6
Catalyst:
    Type, iron oxide base
    $O_2$ content after reduction, <5% based on Fe
    Average particle size, 70 microns The run was interrupted after 359 hours, no appreciable amounts of wax having been formed to this point. During the interruption of the run no precautions were taken to avoid oxidation of the catalyst. When this catalyst was placed back on stream at the same conditions appreciable wax formation was observed in suspension in the hydrocarbon product and temperatures indicated poor fluidization.

Thereafter the catalyst was reduced in situ with hydrogen at 700°–750° F. and 400 p. s. i. g.

pressure for 26 hours. When the reduced catalyst was placed back on stream at the conditions specified above, the hydrocarbon product collected did not show any evidence of suspended wax.

The advantages of the invention and preferred means for securing the same will now be further explained with reference to the accompanying drawing in which Figure 1 is a graphical illustration of the relationship between oxygen content of the catalyst and wax formation in the reactor; and Figure 2 is a semidiagrammatical view of equipment suitable to carry out the preferred embodiments of the invention.

Referring now to Figure 1 the curve shown therein represents an evaluation of various fluid type synthesis runs carried out at substantially identical conditions except for the oxygen content of the catalyst. The essential reaction conditions are given in the legend of Figure 1. The catalysts used were as follows:

"NH₃ synthesis catalyst" (runs 1 and 2) is a fused high purity magnetite promoted with about 1.5% of K₂O and about 3% of alumina, and initially reduced by treating with H₂ at 250 p. s. i. g. and 725° F. to an oxygen content of <5%.

"NH₃ synthesis catalyst, precarbided" (run 3) is the "NH₃ synthesis catalyst" first reduced as above and then subjected to a treatment with an 8/1 H₂/CO gas mixture at 623° F. and atmospheric pressure in fluid operation for 8 hours.

"1.5% K₂CO₃ resintered pyrites" (runs 4 and 5) is a sintered iron pyrites ash resintered with air in the presence of about 5% of coke and 1.5% of K₂CO₃ at about 2200°–2500° F. and initially reduced as indicated above to an oxygen content of <5%.

The oxygen content of the catlyst used for the correlation with the wax formation was determined by analysis of samples withdrawn during the runs. The same procedure was used to determine the wax formation on the catalyst.

It will be seen from the curve that wax formation increases rapidly as the oxygen content increases, substantially alike for all three catalysts tested. Wax formation may therefore be readily controlled by controlling the oxygen content of the catalyst under otherwise equal conditions.

Referring now to Figure 2 of the drawing, reference numeral 10 indicates a reaction vessel wherein a mixture of hydrogen and carbon monoxide admitted through line 12 is brought into contact with a finely divided catalyst mass 16 in a fluidized condition. The catalyst is initially added to the system through line 18 from hopper 20. Catalyst may also be added through line 22 from hopper 24. Vessel 10 is provided with a catalyst withdrawal line 26 and a gas distributing means, such as a grid 14. One or more gas-solid separating units such as cyclone separator 30 with dip pipe 32 may be arranged in the top of vessel 10. Cyclone separator 30 is connected to a discharge line 28.

The hydrogen and carbon monoxide supplied through line 12 and grid 14 pass upwardly through the catalyst 16 at a linear velocity of between about 0.2 to 5 ft. per second and, preferably, from about 0.2 to 1.5 ft. per second to convert the finely divided catalyst into a dense suspension of catalyst resembling a boiling liquid in appearance and behavior. The particle size distribution of the catalyst may be between about 1 micron and 500 microns and, preferably, as follows: 0–20μ=20–30%, 80+μ=30–40%. The density of the fluidized mass may be from about 30 to 150 pounds per cubic foot depending upon the amount of the catalyst in the vessel 10, the average particle size and the gas velocity. The fluidized mass maintains a general level L in the reactor some distance from the top of the vessel. Small quantities of catalyst fines are carried overhead. The density of the phase above level L may be about 0.1 to 0.2 pound per cubic foot. The catalyst material is preferably metallic iron promoted with a minor amount of a potassium compound such as from about 0.3% to 1.5% potassium carbonate. Material of this type may be initially added to reaction vessel 10 through line 18 from hopper 20. After the reaction has proceeded for some time, a portion of the catalyst may be withdrawn through line 26 and a corresponding quantity of catalyst added through line 22 from hopper 24. The catalyst supplied through line 22 is fresh unreduced catalyst prepared from an iron oxide.

The reaction conditions in vessel 10 may be as follows:

|  | Broad Range | Preferred Range |
| --- | --- | --- |
| Temperature, °F | 500–750 | 625–725 |
| Pressure, p. s. i. g | 100–750 | 400–600 |
| Linear Velocity, ft./sec | 0.2–5.0 | 0.4–1.5 |
| Fluidized Catalyst Density lbs./cu. ft | 10–100 | 20–60 |
| Feed rate, cu. ft. H₂+CO/hr./lb. of Catalyst | 5–90 | 10–40 |

The heat generated by the reaction may be absorbed by any conventional cooling means not shown.

At the conditions specified a dilute suspension of catalyst fines entrained in gasiform products passes into the upper portion of reaction vessel 10 above level L and enters cyclone separator 30. Catalyst separated in cyclone separator 30 may be returned to the fluidized mass 16 through dip pipe 32. The gases and vapors separated in cyclone 30 pass overhead through line 28 to a product recovery unit 34. In the product recovery unit 34 the reaction product is separated into a water layer and a plurality of fractions such as the normally gaseous material largely consisting of normally gaseous hydrocarbons, unreacted hydrogen and carbon monoxide, a naphtha fraction boiling usually up to about 400° F. and higher boiling fractions varying from gas oils to solid waxes, in a manner known per se.

In accordance with the invention, a balance may be maintained between the catalyst withdrawal through line 26 and the addition of unreduced catalyst through line 22. By the control of this withdrawal and addition, the nature of the reaction product recovered in unit 34 may be determined with respect to the relative proportion of hydrocarbons boiling up to about 400° F. to those boiling above 400° F.

Similar results may be obtained by periodically admitting an oxidizing gas through line 12, in place of the addition of fresh unreduced catalyst through line 22, in the manner previously described. For example, air or air mixed with a diluent may be admitted at intervals of about 24 to 100 hours for about 1 to 5 hours at the flow conditions of the run while maintaining temperatures of about 625° to 725° F. and pressures of about 400 to 600 p. s. i. g. in reactor 10.

When it is desired to reoxidize the catalyst without interrupting the synthesis reaction, catalyst continuously or periodically withdrawn through line 26 may be passed through line 36 to a separate oxidizing vessel 38 which may have a construction similar to that of reactor 10. Air may be supplied through line 40 at conditions similar to those of the in-situ oxidation described above. Reoxidized catalyst may be withdrawn through line 42 from the bottom of vessel 38, mixed with fresh or spent synthesis gas supplied through line 44 and then returned through line 46 as a dilute solids-in-gas suspension to reactor 10 under the pseudohydrostatic pressure of the fluidized mass in vessel 38. It will be understood that vessel 38 may also be used as a reducing zone using hydrogen at reducing conditions, in a generally analogous manner.

Other modifications of the system illustrated in the drawing may appear to those skilled in the art without departing from the spirit of the invention.

The preceding description and exemplary operations have served to illustrate the invention, but are not intended to limit the scope of the invention. Only such limitations should be imposed on the invention as are indicated in the appended claims.

What is claimed is:

1. The process of increasing the content of high molecular weight hydrocarbon in the total liquid product synthesized from a gas mixture of hydrogen and carbon monoxide which comprises passing said gas mixture at a temperature of between about 625 and 725° F. and a pressure of between about 400 to 600 pounds per square inch in contact with a catalyst consisting of a major amount of metallic iron and iron oxides promoted with a minor amount of a potassium compound, said conditions corresponding to a normal equilibrium content of between about 5% and 20% of oxygen based on total iron in the catalyst while producing a yield of total $C_4+$ product overhead of at least about 175 cc. per cubic meter of $H_2+CO$ consumed at a synthesis gas $H_2$ to $CO$ feed ratio of between about 1:1 and 2:1, said product containing normally an amount of high molecular weight material insufficient to raise the pour point of the total product above about 0° F., raising the oxygen concentration of said catalyst to a value above said normal equilibrium value, within the range of about 20% to 35% by weight of $O_2$ based on total Fe, and maintaining said increased oxygen content continuously for an extended period of time to produce a total $C_4+$ product containing an increased amount of high molecular weight products over that normally obtained at said operating conditions.

2. The process according to claim 1 in which said synthesis reaction is started with a fluidized mass of substantially reduced catalyst, and in which fresh unreduced iron oxide catalyst is added continually to said reduced catalyst during the course of said reaction in amounts sufficient to maintain the oxygen content of the total catalyst at a value above said equilibrium range.

3. The process of claim 2 in which about 2 to 10% of fresh unreduced iron oxide catalyst, based on catalyst inventory, is added per day.

4. The process according to claim 1 in which the total catalyst in the reaction zone is kept thoroughly mixed in the form of a turbulent fluid bed, an aliquot portion of said total catalyst is continually withdrawn from said fluid bed and allowed to oxidize spontaneously in an oxygen-containing gas, controlling the oxygen content of said latter gas to avoid overheating of the catalyst, returning said reoxidized catalyst to the reactor, and controlling the rate of said catalyst withdrawal and its return after reoxidation to supply an amount of iron oxide sufficient to maintain the total oxygen content of the catalyst in the reactor at said level substantially above the normal 5–20% equilibrium oxygen content.

JOHN J. OWEN.
SIMPSON D. SUMERFORD.

REFERENCES CITED

The following references are of record in the file of this patent:

UNITED STATES PATENTS

| Number | Name | Date |
| --- | --- | --- |
| 2,348,418 | Roesch et al. | May 9, 1944 |
| 2,417,164 | Huber | Mar. 11, 1947 |
| 2,449,071 | Hanck et al. | Sept. 14, 1948 |
| 2,449,775 | Hendricksen | Sept. 21, 1948 |
| 2,472,427 | Johnson | June 7, 1949 |
| 2,472,501 | Sweetser | June 7, 1949 |
| 2,497,964 | Sumerford | Feb. 21, 1950 |

OTHER REFERENCES

Interrogation of Dr. Otto Roelen (p. 35), Hobart Publishing Co., Washington, D. C., July 18, 1947.